United States Patent [19]

Chiquet et al.

[11] Patent Number: 5,779,756
[45] Date of Patent: Jul. 14, 1998

[54] METHOD OF CENTRIFUGING A HALIDE GLASS AND FORMING AN OPTICAL FIBER PREFORM

[75] Inventors: Frédéric Chiquet, Massy; Marylise Le Crom, Elancourt; Jean-Jacques Girard, St Germain les Arpajon, all of France

[73] Assignee: Alcatel Alsthom Compagnie Generale d'Electricite, Paris Cedex, France

[21] Appl. No.: 878,626

[22] Filed: Jun. 19, 1997

[30] Foreign Application Priority Data

Jun. 20, 1996 [FR] France ................. 96 07686

[51] Int. Cl.⁶ .................................. C03B 37/027
[52] U.S. Cl. ...................... 65/388; 65/404; 65/145
[58] Field of Search ...................... 65/388, 404, 502, 65/121, 145

[56] References Cited

U.S. PATENT DOCUMENTS

| | | | |
|---|---|---|---|
| 4,729,777 | 3/1988 | Mimura | 65/388 |
| 5,160,521 | 11/1992 | Tran | 65/404 |
| 5,308,371 | 5/1994 | Kawamoto | 65/388 |

FOREIGN PATENT DOCUMENTS

| | | |
|---|---|---|
| 0474919 | 3/1992 | European Pat. Off. |
| 0672628 | 9/1995 | European Pat. Off. |
| 63-21232 | 1/1988 | Japan |

OTHER PUBLICATIONS

Patent Abstracts of Japan, vol. 10, No. 269 (C–373) corresponding to JP-A-61 091032 (NT&T Corp.), dated 9 May 1996.

Patent Abstracts of Japan, vol. 17, No. 259 (C–1061) corresponding to JP-A-05 004831 (NT&T Corp.) dated 14 Jan. 1993.

Patent Abstracts of Japan, vol. 8, No. 162 (C–235), 26 Jul. 1984 corresponding to JP-A-59 064540 (NT&T Corp.) dated 12 Apr. 1984.

S. F. Carter, "Origin of Bubbles in Fluoride Glass Preforms for Infrared Fibres", Physics and Chemistry of Glasses, vol. 32, No. 4, 1 Aug. 1991, pp. 161–167.

*Primary Examiner*—John Hoffmann
*Attorney, Agent, or Firm*—Sughrue, Mion, Zinn, Macpeak & Seas, PLLC

[57] ABSTRACT

A method of fabricating a fluoride glass optical fiber preform which has a fluoride glass core surrounded by a fluoride glass optical cladding includes the following steps: introducing the cladding glass in the molten state into a bottom part of a mold having a cylindrical inside cross-section, introducing the core glass in the molten state into a top part of the mold above the cladding glass, and inwardly solidifying the core glass and the cladding glass from the interface between the glasses and the mold. The kinetics of solidification of the core glass are such that complete solidification of the cladding glass occurs before complete solidification of the core glass. The method further includes the following operations: centrifuging the content of the mold simultaneously with the solidification, wherein because of the reduction in the volume of the glasses during the solidification, a central portion empty of glass and of substantially cylindrical cross-section is formed around an axis of the mold by the completely solidified cladding glass, which thereby forms the cladding of the preform, wherein the core glass is not completely solidified at the end of the centrifuging, after the centrifuging operation, causing the unsolidified core glass to flow into the central portion,so forming the core of the preform, and removing the solidified preform from the mold.

8 Claims, 1 Drawing Sheet

METHOD OF CENTRIFUGING A HALIDE GLASS AND FORMING AN OPTICAL FIBER PREFORM

BACKGROUND OF THE INVENTION

1. Field of the Invention

The present invention concerns a method of fabricating a fluoride glass optical fiber preform. These methods are currently being researched because of the great benefits of using fluoride glass fibers in telecommunications, in particular as amplifying optical fibers in transmission wavelength bands around 1.3 µm and around 1.55 µm.

2. Description of the Prior Art

As is well known in itself, fluoride glass is made up of a mixture of fluorides. Various types of fluoride glass are available, for example ZBLAN type glass based on the following mixture: $ZrF_4$—$BaF_2$—$LaF_3$—$AlF_3$—$NaF$.

Fabricating fluoride glass optical fiber preforms is more difficult than fabricating silica fiber preforms. Because fluoride glasses are made up of complex chemical systems (mixtures of several fluorides, generally at least four), it is difficult to use conventional vapor phase deposition processes to fabricate fluoride fiber glass preforms.

Several methods of fabricating fluoride glass preforms are currently being researched for this reason.

A first of these methods, known as the built-in casting method, consists in pouring into a vertical mold a molten fluoride glass intended to constitute the optical cladding of the preform and leaving it to solidify from its interface with the mold until there remains only a central axial portion of cladding glass that has not solidified. The bottom of the mold is then opened to allow the glass that has not yet solidified to flow out so that a tube is obtained in the mold, into which a molten fluoride glass intended to constitute the core of the preform is poured and cooled. This method has certain disadvantages.

The core/cladding interface is contaminated by impurities from the synthesis atmosphere since the cladding tube is exposed to this atmosphere while it is cooling. It is well known that the attenuation of fluoride glass fibers increases very significantly in the presence of impurities.

Also, given that the core glass is poured at a relatively high temperature compared to the temperature at the surface of the cladding tube, on contact of the two glasses crystallization occurs at the surface of the cladding glass. This creates defects in the preform and therefore in the fiber which degrade its transmission properties, in particular its attenuation.

Finally, the ratio between the diameter of the core of the preform and that of the cladding is low.

Consideration has been given to modifying the above method in the following manner, in order to alleviate these disadvantages. During the solidification of the cladding glass the core glass is poured on top of the cladding glass and afterwards, when the cladding glass has solidified to a sufficient thickness from the interface with the mold, the bottom part of the mold is opened to allow the part of the cladding glass that has not solidified to flow out, so that the core glass that has not yet solidified flows progressively into the tube formed in this way. This method, known as the modified built-in casting method, is described in the article "Manufacture of fluoride-glass preforms" published in the Journal of Non-Crystalline Solids 140 (1992) 265–268, for example.

Although this method solves the first problem of the previous method, it does not solve the crystallization problem, since once again a glass at a high temperature comes into contact with a glass that has already solidified, or the problem of the dimensions (the ratio between the diameter of the preform and that of the cladding remain low).

Also, this method produces preforms in which the core is conical (as in the built-in casting method), which is prejudicial to the transmission properties of the optical fiber because the diameter of its core, which transmits most of the light waves, is not constant, makes it difficult to connect the optical fiber to another fiber and increases losses. This conicity further prevents the application of the conventional sleeving technique since it is necessary to correct the conicity so that the preform can be sleeved using a conventional cylindrical tubular sleeve.

Another method of fabricating a fluoride glass optical fiber preform that is known in itself is the suction casting method. In this method, which is described in document JP 63-11535, the initial steps up to casting the core glass are identical to those of the modified built-in casting method. Instead of opening the bottom part of the mold to allow the cladding glass that has not solidified to flow out, the mold remains closed at all times throughout the process. During the solidification of the cladding glass, the latter contracts and therefore forms a cylindrical tube in the mold and this aspirates the core glass that has not yet solidified into the tube so formed.

Like the previous method, this one solves the first problem of the unmodified built-in casting method, i.e. the interface between the core and the cladding of the preform is free from impurities from the synthesis atmosphere.

On the other hand, the problem of this method stems from the fact that the contraction of the cladding is not uniform, with the result that the core is not cylindrical over all of its length and that the ratio between the diameter of the cladding and that of the core is not constant over all of the length of the preform.

The above discussion indicates that there is at present no method of fabricating a fluoride glass optical fiber preform offering all of the following features simultaneously:
- core/cladding interface free of impurities from the synthesis atmosphere,
- no crystallization of the cladding,
- core cylindrical over all of its length,
- ratio between the core diameter and the cladding diameter constant over all its length and greater than those obtained with the prior art methods.

An aim of the present invention is therefore to develop a method of fabricating a fluoride glass optical fiber preform having all the features mentioned above.

SUMMARY OF THE INVENTION

To this end, the present invention proposes a method of fabricating a fluoride glass optical fiber preform having a core constituted of a core fluoride glass surrounded by an optical cladding constituted of a cladding fluoride glass, said method including the following operations:
- introducing said cladding glass in the molten state into a bottom part of a mold having a cylindrical inside cross-section,
- introducing said core glass in the molten state into a top part of said mold above said cladding glass,
- progressively solidifying said core glass and said cladding glass from the interface between said glasses and said mold, wherein the kinetics of solidification of said core glass are chosen so that complete solidification of said cladding glass occurs before complete solidification of said core glass, said method further including the following operations:

centrifuging the content of said mold simultaneously with said solidification to form around the axis of said mold, because of the reduction in the volume of said glasses on solidification, a central portion empty of glass and of substantially cylindrical cross-section delimited by said completely solidified cladding glass which thereby forms the cladding of said preform, said core glass not being completely solidified at the end of said centrifuging, after the centrifuging operation, causing the unsolidified core glass to float into said central portion, so forming the core of said preform, and removing the solidified preform from the mold.

By virtue of the invention, given that the solidification of the cladding occurs simultaneously with centrifuging, a tube is obtained of constant inside diameter, with the result that the core of the preform has a constant diameter over all of the length of the preform and that the ratio between the diameter of the cladding and that of the core is also constant over all of the length of the preform. Furthermore, centrifuging produces a ratio between the diameter of the core and that of the cladding which is greater than those obtained in the prior art.

What is more, given that the initial steps of introducing the cladding and core glasses into the mold of the method of the invention are similar to those of the modified built-in casting and suction casting methods, there are no impurities from the synthesis atmosphere at the core/cladding interface of a preform obtained in accordance with the invention; nor is there any crystallization of the cladding.

In a first advantageous embodiment of the invention procuring core glass solidification kinetics such that complete solidification of the cladding glass occurs before complete solidification of the core glass, the bottom part of the mold has a diameter less than that of the top part. Because of this the thickness of the core glass is greater than that of the cladding glass and the core glass therefore takes longer to solidify than the cladding glass.

In a second advantageous embodiment of the invention procuring the required solidification kinetics, the bottom part of the mold is made of a different material than the top part, so that its thermal exchanges with the core glass are slower than those of the material of the bottom part of the mold with the cladding glass. Because of this the core glass takes longer to solidify than the cladding glass.

In a third advantageous embodiment of the invention procuring the required solidification kinetics the core glass is introduced into the mold at a temperature higher than that of the cladding glass so that the time for the core glass to solidify is greater than that for the cladding glass to solidify.

Finally, in a fourth advantageous embodiment of the invention procuring the required solidification kinetics, the compositions of the core and cladding glasses are chosen such that their solidification rates are different, that of the core glass being less than that of the cladding glass.

The above four embodiments can be used separately or in combination.

Other features and advantages of the invention will emerge from the following description of one embodiment of the invention given by way of illustrative and non-limiting example only with reference to the accompanying drawings.

DETAILED DESCRIPTION OF THE PREFERRED EMBODIMENT

In all the figures, common parts are identified by the same reference numbers.

Figure 1:
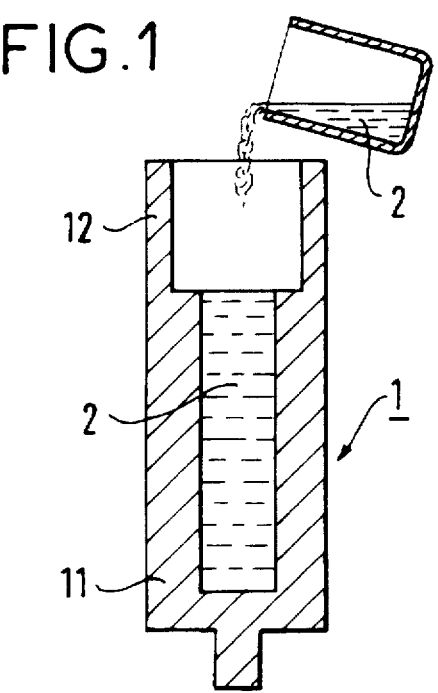
FIG. 1 is schematic sectional view of the operation of introducing the cladding glass in the molten state in the method of the invention.

FIG. 1 shows a brass mold 1 used to fabricate a preform by the method of the invention. The mold 1 has a bottom part 11 having a cylindrical inside cross-section with an inside diameter equal to 15 mm and a height equal to 70 mm and a top part 12 also having a cylindrical inside cross-section and with an inside diameter equal to 25 mm and a height equal to 20 mm.

Before starting the method, the mold 1 is preheated to a temperature between 250° C. and 300° C.

Figure 5:
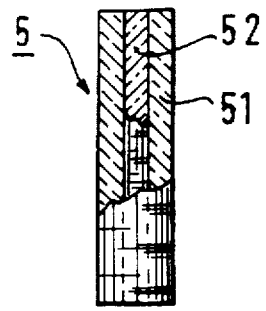
FIG. 5 is schematic sectional view of a preform obtained by the method of the invention.

In a first step of the method of the invention, shown in FIG. 1, molten fluoride glass 2 to constitute the cladding 51 of the preform 5 to be fabricated (see FIG. 5) is poured into the bottom part 11 of the mold 1 which is disposed vertically, i.e. with its top part 12 above its bottom part 11. The ZBLAN type cladding glass 2 has the following composition (molar percent), for example:

53% zirconium fluoride $ZrF_4$,

20% barium fluoride $BaF_2$,

4% lanthanum fluoride $LaF_3$,

3% aluminum fluoride $AlF_3$,

20% sodium fluoride $NaF$.

The molten cladding glass 2 at a temperature between 450° C. and 550° C. is poured into the bottom part 11 of the mold 1 to fill the latter completely.

Figure 2:
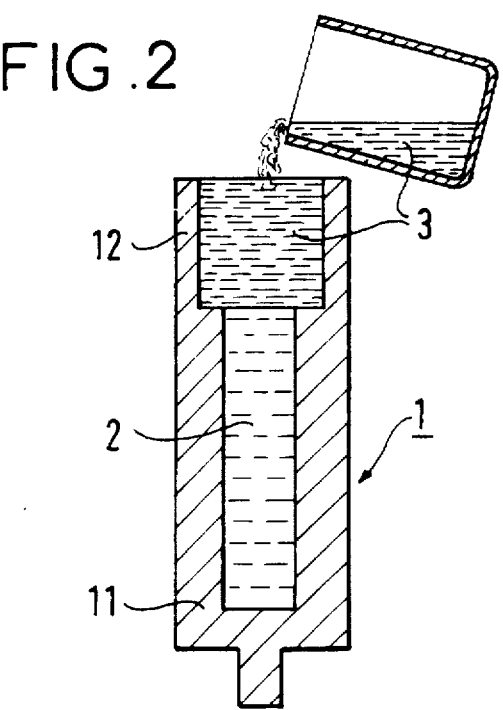
FIG. 2 is schematic sectional view of the operation of introducing the core glass in the molten state in the method of the invention.

In a second step of the method of the invention, shown in FIG. 2, immediately after the preceding step, molten fluoride glass 3 to constitute the core 52 of the preform 5 to be fabricated (see FIG. 5) is poured into the top part 12 of the mold 1, which is still disposed vertically, on top of the still liquid cladding glass 2. This ZBLAN type core glass 3 has the following composition (molar percent):

54% zirconium fluoride $ZrF_4$,

23% barium fluoride $BaF_2$,

4% lanthanum fluoride $LaF_3$,

3% aluminum fluoride $AlF_3$,

16% sodium fluoride $NaF$.

The molten core glass 3 at a temperature between 550° C. and 650° C. is poured into the top part 12 of the mold 1 to fill the latter completely.

Figure 3:
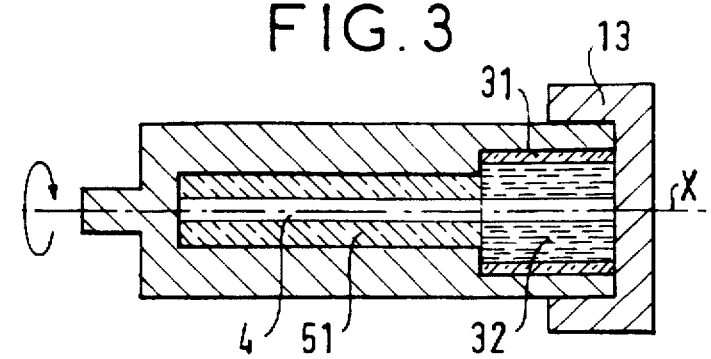
FIG. 3 is schematic sectional view of the centrifuging operation of the method of the invention.

In a third step of the method of the invention, shown in FIG. 3, the mold 1 is closed and sealed by means of a cover 13 provided with sealing means, disposed horizontally, i.e. so that its top part 12 and its bottom part 11 are side by side, and rotated about its horizontal longitudinal axis X at a speed between 1 000 rpm and 5 000 rpm for between 90 seconds and 5 minutes.

Figure 4:
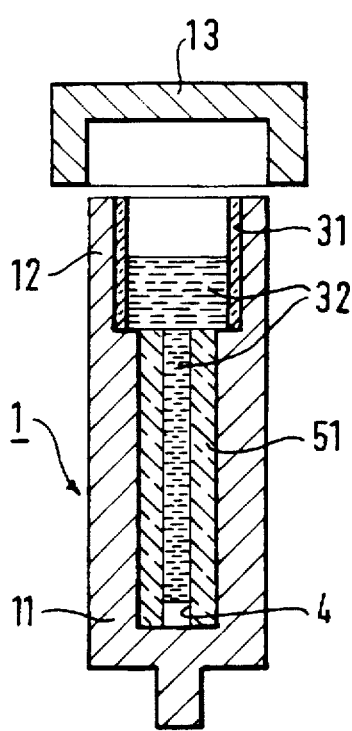
FIG. 4 is schematic sectional view of the core glass flow operation of the method of the invention.

The choice in accordance with the invention of the dimensions of the bottom and top parts 11 and 12 of the mold 1 (diameter of the top part 12 larger than that of the bottom part 11), the temperatures at which the cladding glass 2 and the core glass 3 are poured into the mold (temperature of the cladding glass 2 less than the temperature of the core glass 3), and the duration of the centrifuging step, depending on the compositions of the cladding glass 2 and the core glass 3, controls the kinetics of solidification of the cladding glass 2 and the core glass 3. During centrifuging, the cladding glass 2 therefore solidifies entirely to form a shrinkage cylinder 4 (see FIG. 4) so that a cladding tube 51 is obtained that will constitute the cladding of the preform 5. Because of the centrifuging, the shrinkage cylinder 4 has a uniform diameter over all of its length, which eliminates the conicity problems of the prior art methods.

The diameter of the shrinkage cylinder, which is that of the core 52 of the preform, is easily controlled by choosing the dimensions of the mold, the casting temperature for the cladding glass 2 and the previously mentioned centrifuging parameters.

Because of the way in which the solidification kinetics are controlled, the core glass 3 does not solidify completely during centrifuging, i.e. only a peripheral part 31 of the core glass in contact with the wall of the top part 12 of the mold 1 has solidified at the end of centrifuging, the central part 32 of the core glass 3 being still liquid after centrifuging. This is because the top part 12 of the mold 1 is wider than the bottom part and because the casting temperature of the core glass 3 is higher than that of the cladding glass 2; the time needed for complete solidification of the core glass 3 is therefore greater than the time needed for complete solidification of the cladding glass 2, with the result that after centrifuging only the cladding glass 2 is completely solidified.

In a fourth step of the method of the invention the mold 1 is returned to its initial vertical position and the cover 13 is removed, which causes the central part 32 of the core glass 3 that has remained liquid to flow into the shrinkage cylinder 4 formed by the cladding tube 51. This core glass is then left to solidify to form the core 52 of the preform 5, after which the solidified preform is removed from the mold 1, cutting off the top to eliminate the peripheral part 31 of the core glass 3 that solidified during the centrifuging operation.

There is obtained in this way a preform having the required characteristics in terms of purity and geometry.

The method of the invention is naturally not limited to the embodiment that has just been described.

In particular, there are various methods of controlling the solidification kinetics of the cladding and core glasses, as stated in a non-limiting manner previously, either used alone or in combination with each other.

Moreover, it is not necessary to effect the centrifuging with the mold horizontal; the mold can be vertical during centrifuging. Nevertheless, horizontal centrifuging obtains a shrinkage cylinder with more homogeneous dimensions than vertical centrifuging, which nevertheless remains advantageous in terms of solving the problems of the prior art.

Nor is it necessary to reduce the pressure after centrifuging to enable the core glass to flow into the cladding tube.

Finally, any means as described can be replaced by equivalent means without departing from the scope of the invention.

There is claimed:

1. A method of fabricating a fluoride glass optical fiber preform having a core comprising fluoride glass surrounded by an optical cladding comprising fluoride glass, said method including the steps of:

introducing said cladding glass in a molten state into a bottom part of a mold having a cylindrical inside cross-section, introducing said core glass in a molten state into a top part of said mold above said cladding glass, and inwardly solidifying said core glass and said cladding glass from an interface between said glasses and said mold, wherein the kinetics of the solidification of said core glass are that complete solidification of said cladding glass occurs before complete solidification of said core glass, said method further including the steps of:

centrifuging the classes simultaneously with said solidification, wherein because of the reduction in the volume of said glasses during aid solidification, a central portion empty of glass and of substantially cylindrical cross-section is formed around an axis of said mold by said completely solidified cladding glass which thereby forms the cladding of said preform, and wherein said core glass is not completely solidified at the end of said centrifuging, after said centrifuging operation, causing the unsolidified core glass to flow into said central portion and solidfy therein, thereby forming the core of said preform, and removing the solidified preform from the mold.

2. The method claimed in claim 1 wherein said bottom part of said mold has a diameter less than a diameter of said top part.

3. The method claimed in claim 1 wherein said top part of said mold is made from a material which is different from a material of said bottom part of said mold, wherein a heat exchange rate between said material of said top part of said mold and said core glass is slower than a heat exchange rate between said material of said bottom part of said mold and said cladding glass.

4. The method claimed in claim 1 wherein said core glass is introduced at a temperature higher than a temperature of said cladding glass so that a solidification time of said core glass is greater than a solidification time of said cladding glass.

5. The method claimed in claim 1 wherein the compositions of said core and cladding glasses are such that a rate of solidification of said core glass is lower than a rate of solidification of said cladding glass.

6. The method claimed in claim 1 wherein, during said centrifuging step, said mold is disposed horizontally so that said top and bottom parts are side by side.

7. The method claimed in claim 1 wherein, before said centrifuging step and after the introducing of said core and cladding glasses into said mold, said top part of said mold is closed and sealed.

8. The method claimed in claim 1 wherein said core and classing glasses are ZBLAN glasses.

* * * * *